Sept. 10, 1946.　　　　L. L. MITCHELL　　　　2,407,507
BASKET
Filed May 2, 1944
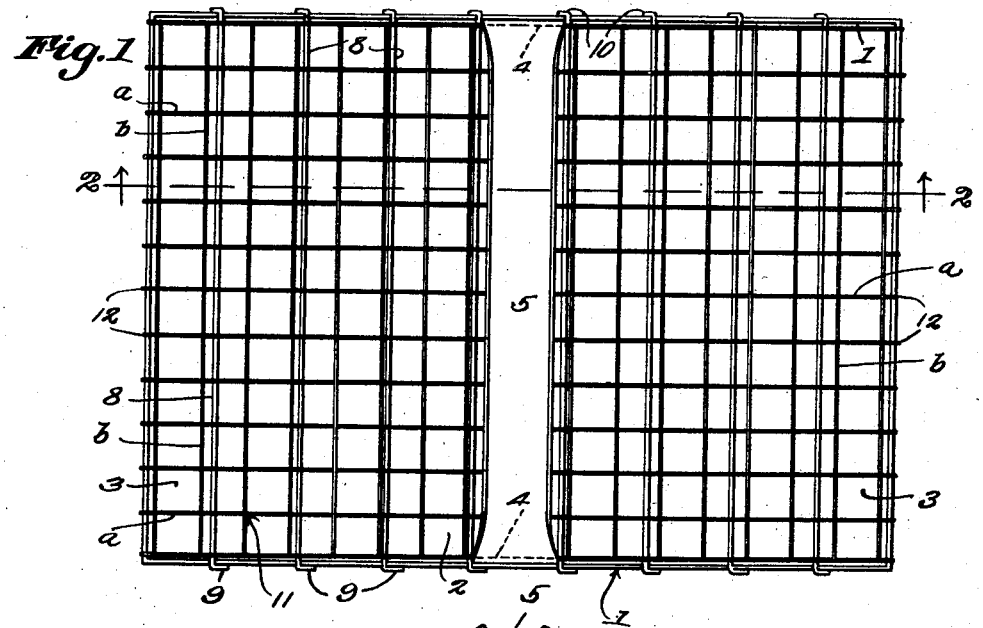
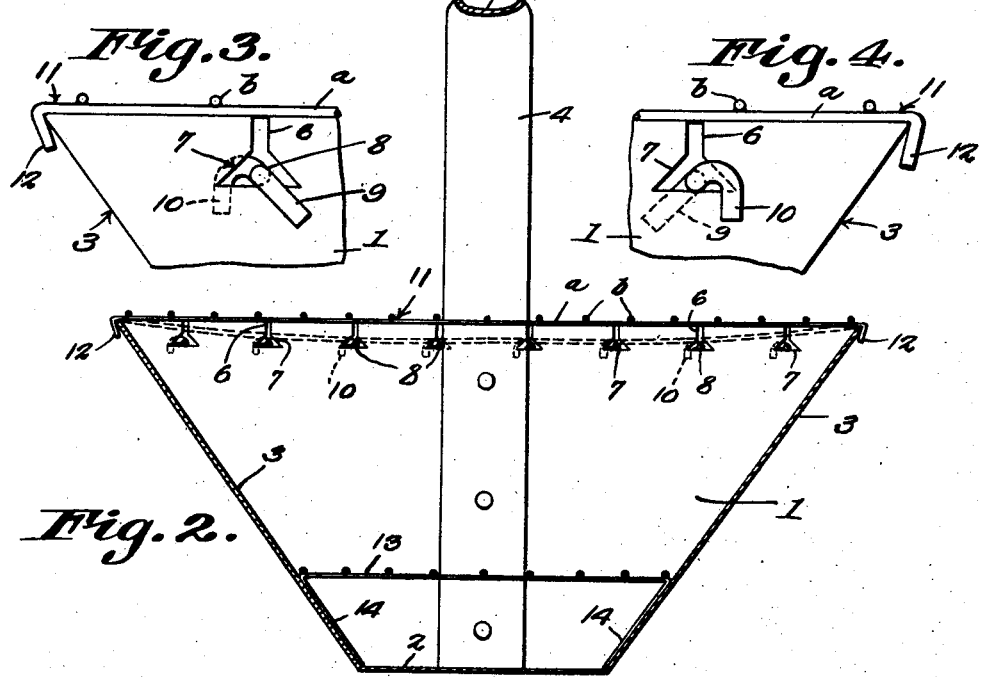
L. L. Mitchell
INVENTOR.

Patented Sept. 10, 1946

2,407,507

UNITED STATES PATENT OFFICE 2,407,507

BASKET

Luther L. Mitchell, Anniston, Ala.

Application May 2, 1944, Serial No. 533,717

1 Claim. (Cl. 47—41)

This invention relates to a basket designed primarily for holding flowers, one of the objects being to provide a simple and efficient device of this character which can be readily carried so that persons engaged in picking flowers can readily insert them into the basket where they will be held in properly spaced positions without crowding and result in injury.

A further object is to provide a structure of this character which can also serve as a holder for water whereby the flowers may be maintained in a fresh condition during or subsequent to the picking operation.

With the foregoing and other objects in view which will appear as the description proceeds, the invention consists of certain novel details of construction and combinations of parts hereinafter more fully described and pointed out in the claims, it being understood that changes may be made in the construction and arrangement of parts without departing from the spirit of the invention as claimed.

In the accompanying drawing the preferred form of the invention has been shown.

In said drawing,

Figure 1 is a plan view of the basket.

Figure 2 is a section on line 2—2, Fig. 1, the grid being shown by broken lines sagging against spacing rods but held in place by its end fingers.

Figure 3 is a side elevation of one corner portion of the basket.

Figure 4 is a similar view showing an opposed corner portion.

Figure 5 is a perspective view of a spacing bar.

Referring to the figures by characters of reference, 1 designates the side walls of the basket which can be of thin sheet metal or any other suitable material and are connected at their lower edges by a flat bottom 2 which can be integral therewith. Downwardly converging end walls 3 connect the corresponding end edges of the walls 1 and also the end edges of the bottom 2 so that the bottom and walls thus cooperate to combine a receptacle capable of holding water. The sides 4 of a handle 5 are secured to the walls 1, the handle being spaced from and extended across the top of the basket.

The upper edge of each of the walls 1 has a slot 6 extended downwardly thereinto for a short distance, the lower portion of each slot being enlarged as shown at 7 so as to have a substantially triangular configuration. The slots in each wall are directly opposite to corresponding slots in the other wall 1 so that it is thus possible for these slots to receive spacing and grid supporting rods 8. Each rod is extended transversely of the basket and is provided at its ends with offset fingers 9 and 10. Each finger 9 is preferably extended in a direction differing from that of the finger 10 and the fingers are so located that when the rod is seated in the enlarged lower ends 7 of the slots 6, the fingers will be supported close to the outer surfaces of the walls 1 and at points where they will prevent the rods from being pulled longitudinally from the slots. The rods can only be removed by lifting them through the restricted upper portions 6 thereof.

Removably mounted on the top edges of the end walls 3 and over the rods 8 is a grid 11 formed of crossed wires soldered or otherwise joined and providing angular spaces between them. The wires extending longitudinally of the basket or from end to end thereof are provided with downturned fingers 12 at the ends thereof which are extended along slightly converging lines as will be apparent by referring to Figs. 2 and 3. The width of the grid is less than the interior of the basket and the distance between these fingers at the angles formed by them with their wires is equal to the overall length of the top portion of the basket. Thus it is possible to spring the grid into position by buckling the grid downwardly and slipping the fingers 12 over the upper edges of the end walls 3. When the grid is substantially flattened thereafter it will be held assembled with the basket and cannot be shaken therefrom. However it can be removed readily simply by removing the rods 8 and depressing the center of the grid with sufficient force to spring the fingers past the upper edges of the walls.

The transverse wires of the grid terminate inwardly from the side walls 1 of the basket as will be noted by referring to Fig. 1. In this figure, the longitudinal wires of the grid have been indicated at $a$ while the transverse wires have been indicated at $b$.

As the distance from front to back of the grid is slightly less than the distance between the walls 1, it becomes possible for this grid to flex downwardly slightly in order to bind the fingers 12 against the end walls 3 should the grid be subjected to a load. This sagging of the grid can be limited, however, by the rods 8 extended from front to back of the basket, before the fingers are brought to position where they can be lifted out of engagement with the walls 3.

Located in the bottom of the basket is a lower and smaller grid 13, similar in construction to the grid 11. However instead of having short, downwardly converging fingers as shown at 12, this lower grid has long downwardly converging fingers 14 the lower end of which rest upon the bottom 2 while the fingers normally spring outwardly to a slight extent away from each other so as to bind frictionally against the end walls 3. Thus the fingers serve to support the grid 13 while holding it properly positioned in the basket.

In practice the basket is carried in the usual way and as the flowers are picked, the stems thereof are inserted through the grid 11 and grid 13 so as thus to be supported in upstanding positions. If the stems of the flowers are provided with considerable foilage which would interfere with their insertion into the upper grid 11, said grid can be removed and the flowers inserted between the rods 8 and into the lower grid 13. This arrangement would be especially useful where the basket is employed for holding such flowers as gladioli, iris, etc. Where roses are picked with long stems or any other flowers are gathered without foilage on their stems, the upper and lower grids can be used.

Obviously a desired amount of water can be contained within the basket so that the picked flowers will be kept fresh.

In Fig. 2 the grid 11 has been shown by broken lines in one of the positions it may assume when subjected to weight so as to be supported by the bars 8.

What is claimed is:

A basket for holding picked flowers including a container portion and a handle portion joined thereto, said container portion having downwardly converging end walls and parallel side walls, a flexible grid removably mounted on the end walls and spaced from the side walls, downwardly converging fingers at the ends of the grid extending under portions of and normally engaging said end walls and underlying the upper edges of said end walls, and supporting rods detachably connecting the parallel walls, said rods being located beneath the grid to support the same between its ends and prevent excessive sagging of the grid between the side walls.

LUTHER L. MITCHELL.